United States Patent
Kotecha et al.

(10) Patent No.: US 8,665,717 B2
(45) Date of Patent: *Mar. 4, 2014

(54) DATA RATE AWARE SCHEDULING IN ADVANCED WIRELESS NETWORKS

(75) Inventors: Lalit R. Kotecha, San Ramon, CA (US); William H. Stone, Basking Ridge, NJ (US); Lee K. Tjio, Danville, CA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 306 days.

This patent is subject to a terminal disclaimer.

(21) Appl. No.: 13/030,186

(22) Filed: Feb. 18, 2011

(65) Prior Publication Data

US 2012/0213072 A1 Aug. 23, 2012

(51) Int. Cl.
*G01R 31/08* (2006.01)

(52) U.S. Cl.
USPC ......... 370/230.1; 370/232; 370/235; 370/328

(58) Field of Classification Search
USPC .......................................... 370/229–235, 328
See application file for complete search history.

(56) References Cited

U.S. PATENT DOCUMENTS

| | | | | |
|---|---|---|---|---|
| 8,064,382 B2 * | 11/2011 | Zisimopoulos et al. | ....... | 370/322 |
| 8,295,174 B2 * | 10/2012 | Wu et al. | ........................ | 370/233 |
| 2010/0318670 A1 * | 12/2010 | Al-Shalash et al. | .......... | 709/229 |
| 2012/0026947 A1 * | 2/2012 | Miller et al. | ................... | 370/329 |
| 2012/0028626 A1 * | 2/2012 | Marocchi et al. | .......... | 455/422.1 |
| 2012/0039175 A1 * | 2/2012 | Sridhar et al. | ................ | 370/236 |
| 2012/0052866 A1 * | 3/2012 | Froehlich et al. | ............. | 455/445 |
| 2012/0182859 A1 * | 7/2012 | Ikeda et al. | ................... | 370/216 |
| 2012/0287790 A1 * | 11/2012 | Huang et al. | .................. | 370/236 |
| 2013/0121206 A1 * | 5/2013 | Turanyi et al. | ................ | 370/254 |

* cited by examiner

*Primary Examiner* — Phuc Tran

(57) ABSTRACT

A base station for an Internet protocol (IP) wireless access network receives an initial attach request from a user device. Based on the initial attach request, a policy and charging rules function (PCRF) device provides to the base station, a subscriber bearer policy that includes a particular quality-of-service control indicator (QCI) value, an uplink data rate limit, and a downlink data rate limit. The base station calculates an uplink bandwidth allocation, based on the QCI value and the uplink data rate limit, that is proportionate to the total maximum data rate of all uplink traffic with the same QCI value. The base station also calculates a downlink bandwidth allocation, based on the QCI value and the downlink data rate limit, that is proportionate to the total maximum data rate of all downlink traffic with the same QCI value.

20 Claims, 9 Drawing Sheets

610 — RECEIVE, FROM USER DEVICE, ATTACH REQUEST FOR IP WIRELESS ACCESS NETWORK

620 — RECEIVE, FROM NETWORK DEVICE, BEARER POLICY WITH UL APN-AMBR / DL APN-AMBR

630 — DETECT CONGESTION ASSOCIATED WITH IP WIRELESS ACCESS NETWORK

640 — CALCULATE ALLOCATION OF UL BANDWIDTH BASED ON QCI AND UL APN-AMBR OF BEARER POLICY

650 — PROVIDE BANDWIDTH ALLOCATION FOR UL TRAFFIC WITH THE QCI VALUE TO USER DEVICE

660 — CALCULATE ALLOCATION OF DL BANDWIDTH BASED ON QCI AND DL APN-AMBR OF BEARER POLICY

670 — APPLY CALCULATED DL BANDWIDTH TO DL TRAFFIC, WITH THE QCI VALUE, FOR USER DEVICE

DATA RATE AWARE SCHEDULING IN ADVANCED WIRELESS NETWORKS

BACKGROUND

A fourth generation (4G) wireless network is an all Internet protocol (IP) wireless access network in which different advanced multimedia application services (e.g., voice over IP (VoIP) content, video content, etc.) are delivered over IP. As wireless network data rates improve using 4G technologies, more and more bandwidth-intensive applications and devices are being developed. For example, some mobile devices, such as smart mobile devices like iPhone and Android devices, may receive high bit rates of 10-50 megabits per second (Mbps) or more, which is significantly more data than a typical cellular phone. In a multiple access network, these different devices and multimedia application services compete for the same air interface and transport network resources.

To differentiate services, mobile operators tend to provide different rate limiting (e.g., a maximum bit rate or an average maximum bit rate) to different subscribers and at the same time provide monthly data usage buckets. However, during periods of network congestion, Quality of Service (QoS) factors may be implemented that fail to account for subscriber rate limiting. Thus, during periods of network congestion and for traffic that is configured with the same QoS value, a subscriber with a higher subscription rate limit may be given the same limit as subscriber with a lower subscription rate limit.

DETAILED DESCRIPTION OF PREFERRED EMBODIMENTS

The following detailed description refers to the accompanying drawings. The same reference numbers in different drawings may identify the same or similar elements.

Systems and/or methods described herein may provide subscriber rate limit configurations to differentiate bandwidth allocations determined by a wireless base station when QoS limits (based on quality control indicator (QCI) values) are applied. The systems and/or methods may provide different bandwidth allocations to traffic from user devices with the same QCI values based on the subscriber rate limit configurations in order to maintain distinct differentiated service levels during periods of network congestion.

In one example implementation, the systems and/or methods may receive a policy to limit subscriber traffic over a particular bearer for an IP wireless access network, where the policy includes a particular QCI value, and one or more of an uplink data rate limit and a downlink data rate limit. The system and/or methods may detect network congestion associated with the IP wireless access network and may calculate a bandwidth allocation for the bearer based on the QCI value and the one or more of the uplink data rate limit and the downlink data rate limit. The calculated bandwidth allocation may be proportionate to the total maximum data rate of all downlink traffic with the same QCI value.

As used herein, the terms "subscriber" and/or "user" may be used interchangeably. Also, the terms "subscriber" and/or "user" are intended to be broadly interpreted to include a user device (e.g., a mobile telephone, a smart phone, etc.) or a user of a user device.

Figure 1:
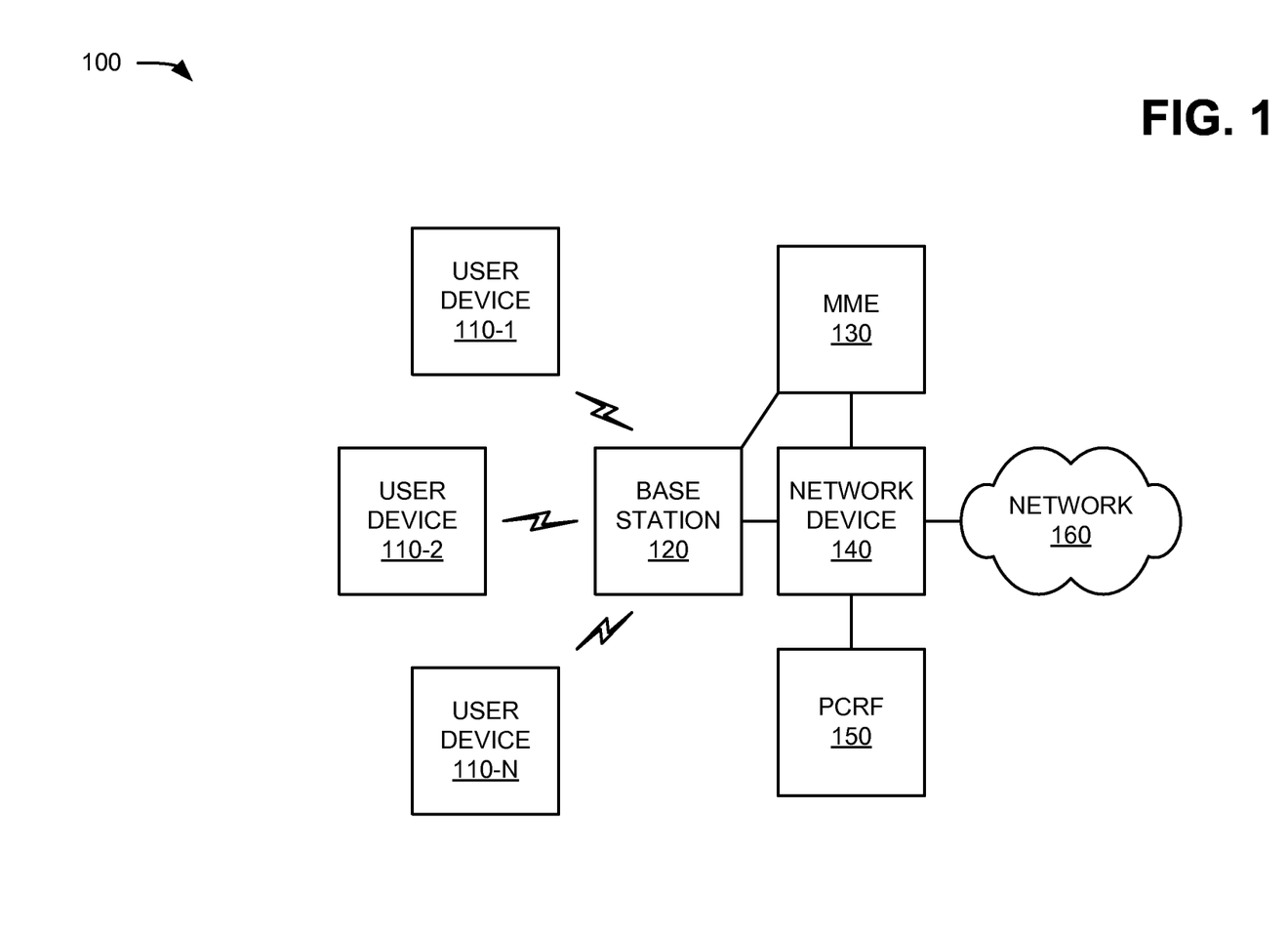
FIG. 1 is a diagram of an example network in which systems and/or methods described herein may be implemented.

FIG. 1 is a diagram of an example network 100 in which systems and/or methods described herein may be implemented. As illustrated, network 100 may include three user devices 110-1, 110-2, and 110-3 (collectively referred to herein as "user devices 110," and, in some instances, singularly as "user device 110"), a base station 120, a mobility management entity (MME) 130, a network device 140, a policy and charging rules function (PCRF) 150, and a network 160. Components of network 100 may interconnect via wired and/or wireless connections. Three user devices 110, one base station 120, one MME 130, one network device 140, one PCRF 150, and one network 160 have been illustrated in FIG. 1 for simplicity. In practice, there may be more user devices 110, base stations 120, MMEs 130, network devices 140, PCRFs 150, and networks 160.

User device 110 may include any device that is capable of communicating with network 160 via an IP wireless access network (e.g., provided by base station 120, MME 130, and/or network device 140). For example, user device 110 may include a mobile computation and/or communication device, such as a radiotelephone, a personal communications system (PCS) terminal (e.g., that may combine a cellular radiotelephone with data processing and data communications capabilities), a personal digital assistant (PDA) (e.g., that can include a radiotelephone, a pager, Internet/intranet access, etc.), a wireless device, a smart phone, a laptop computer (e.g., with a wireless air card), a global positioning system (GPS) device, a content recording device (e.g., a camera, a video camera, etc.), etc. In another example, user device 110 may include a fixed (e.g., provided in a particular location, such as within a subscriber's home) computation and/or communication device, such as a laptop computer, a personal computer, a tablet computer, a set-top box (STB), a television, a gaming system, etc.

Base station 120 may include one or more computation and/or communication devices that receive voice and/or data from MME 130 and/or network device 140 and wirelessly transmit that voice and/or data to user device 110. Base station 120 may also include one or more devices that wirelessly receive voice and/or data from user device 110 and transmit that voice and/or data to one of MME 130, network device 140, and/or other user devices 110. In implementations herein, base station 120 may enforce QoS constraints due to congestion in the wireless IP access network. In some cases, base station 120 may also be referred to as an eNodeB.

In one example implementation, base station 120 may receive an initial attach request from user device 110. Based on the initial attach request, base station 120 may eventually receive a subscriber bearer policy that includes a particular QCI value, an uplink data rate limit, and a downlink data rate limit. Based on the QCI value and the uplink data rate limit, base station 120 may calculate an uplink bandwidth allocation that is proportionate to the total maximum data rate of all uplink traffic with the same QCI value. Base station 120 may provide the calculated uplink bandwidth allocation to user device 110 to rate limit uplink traffic (e.g., during periods of network congestion). Based on the QCI value and the downlink data rate limit, base station 120 may also calculate a downlink bandwidth allocation that is proportionate to the total maximum data rate of all downlink traffic with the same QCI value. Base station 120 may use the calculated downlink bandwidth allocation to rate limit downlink traffic (e.g., during periods of network congestion). Further details of base station 120 are provided below in connection with one or more of FIGS. 2-5.

MME 130 may include one or more computation and/or communication devices that provide a convergence point between wireless protocols (e.g., associated with user device 110 and/or base station 120) and IP protocols (e.g., associated with PCRF 150 and network 160). MME 130 may be involved in a bearer activation/deactivation process (e.g., for user device 110) and may choose a network device 140 for user device 110 at an initial attachment and/or handover.

Network device 140 may include one or more data transfer devices, such as a mobile gateway, a router, a switch, a firewall, a network interface card (NIC), a hub, a bridge, a proxy server, an optical add-drop multiplexer (OADM), or some other type of device that processes and/or transfers data. In one example, network device 140 may route packets (or portions of packets) from a wireless network (e.g., user device 110 and base station 120) to another network (e.g., network 160).

In one example implementation, network device 140 may receive (e.g., from PCRF 150) a policy configuration (e.g., that includes a QCI, a downlink data rate limit, and an uplink data rate limit) for a subscriber and/or an application service associated with user device 110, and may provide the policy configuration to base station 120. Further details of network device 140 are provided below in connection with one or more of FIGS. 2, 3, and 5.

In one example, base station 120, MME 130, and/or network device 140 may provide an all IP wireless access network for user device 110. The IP wireless access network, in one implementation, may correspond to a 4G network, a Long Term Evolution (LTE) network, an advanced LTE network, etc. The LTE network may include a communications network that connects subscribers (e.g., user device 110) to another device (e.g., within network 160). In another implementation, the IP wireless access network may include a WiFi network or other access networks (e.g., an enhanced high-rate packet data (eHRPD) network or a WiMax network). In other implementations, the wireless access network may include a wireless network other than an IP wireless access network.

PCRF 150 may include one or more computation or communication devices that may provide policy control decision and flow based charging control functionalities. PCRF 150 may provide network control regarding service data flow detection, gating, QoS and flow based charging, etc. PCRF 150 may determine how a certain service data flow shall be treated, and may ensure that user plane traffic mapping and treatment is in accordance with a user's subscription profile.

In one example implementation, PCRF 150 may receive (e.g., from a network administrator) a policy configuration for subscribers and/or application services provided by the IP wireless access network (e.g., provided by base station 120 and/or network device 140). The subscriber policy configuration may define rate limits associated with subscribers of the IP wireless access network. For example, the subscriber policy configuration may include a QoS level (e.g., a QCI value), a maximum downlink bit rate, and a maximum uplink bit rate. More particularly, PCRF 150 may include a downlink access point name aggregated maximum bit rate (APN-AMBR), and an uplink APN-AMBR. The QCI value may include a Differentiated Services Code Point (DSCP) value or other priority indication that indicates treatment the packets in that class may receive in the event of network congestion. The APN-AMBR may include a value (e.g., in Mbps) that identifies a rate limit, for a particular subscriber or class of subscribers, to an access point, such as network 160. For example, if a first subscriber pays a higher fee than a second subscriber for services provided by the IP wireless access network, then the subscriber policy configuration may allocate more resources of the IP wireless access network to the first subscriber than to the second subscriber. Also, the downlink APN-AMBR and the uplink APN-AMBR may be the same or different values. Further details of PCRF 150 are provided below in connection with one or more of FIGS. 2, 3, and 5.

Network 160 may include a local area network (LAN), a wide area network (WAN), a metropolitan area network (MAN), a telephone network, such as the Public Switched Telephone Network (PSTN), an intranet, the Internet, an optical fiber (or fiber optic)-based network, a cable television network, a satellite television network, or a combination of networks. In one implementation, network 160 may include an IP core network and/or one or more packet data networks (PDNs).

Although FIG. 1 shows example components of network 100, in other implementations, network 100 may include fewer components, different components, differently arranged components, and/or additional components than those depicted in FIG. 1. Alternatively, or additionally, one or more components of network 100 may perform one or more other tasks described as being performed by one or more other components of network 100.

Figure 2:
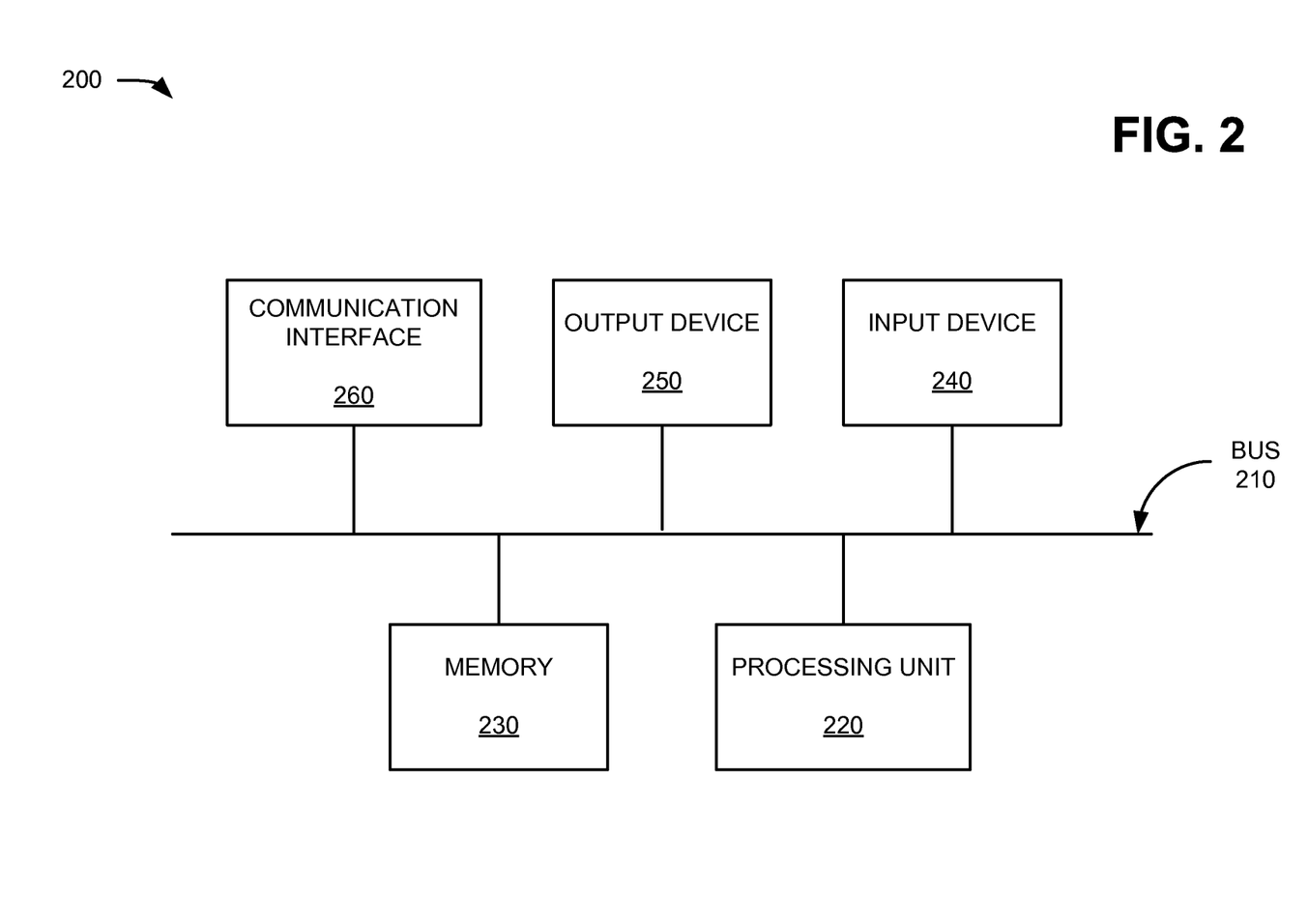
FIG. 2 is a diagram of example components of one or more of the devices of the network depicted in FIG. 1.

FIG. 2 is a diagram of example components of a device 200 that may correspond to one of the devices of network 100. As illustrated, device 200 may include a bus 210, a processing unit 220, a memory 230, an input device 240, an output device 250, and a communication interface 260.

Bus 210 may permit communication among the components of device 200. Processing unit 220 may include one or more processors or microprocessors that interpret and execute instructions. In other implementations, processing unit 220 may be implemented as or include one or more application specific integrated circuits (ASICs), field programmable gate arrays (FPGAs), or the like.

Memory 230 may include a random access memory (RAM) or another type of dynamic storage device that stores information and instructions for execution by processing unit 220, a read only memory (ROM) or another type of static storage device that stores static information and instructions for the processing unit 220, and/or some other type of magnetic or optical recording medium and its corresponding drive for storing information and/or instructions.

Input device 240 may include a device that permits an operator to input information to device 200, such as a keyboard, a keypad, a mouse, a pen, a microphone, one or more biometric mechanisms, and the like. Output device 250 may include a device that outputs information to the operator, such as a display, a speaker, etc.

Communication interface 260 may include any transceiver-like mechanism that enables device 200 to communicate with other devices and/or systems. For example, communication interface 360 may include mechanisms for communicating with other devices, such as other devices of network 100.

As described herein, device 200 may perform certain operations in response to processing unit 220 executing software instructions contained in a computer-readable medium, such as memory 230. A computer-readable medium may be defined as a non-transitory memory device. A memory device may include space within a single physical memory device or spread across multiple physical memory devices. The software instructions may be read into memory 230 from another computer-readable medium or from another device via communication interface 260. The software instructions contained in memory 230 may cause processing unit 220 to perform processes described herein. Alternatively, hardwired circuitry may be used in place of or in combination with software instructions to implement processes described herein. Thus, implementations described herein are not limited to any specific combination of hardware circuitry and software.

Although FIG. 2 shows example components of device 200, in other implementations, device 200 may include fewer components, different components, differently arranged components, or additional components than depicted in FIG. 2. Alternatively, or additionally, one or more components of device 200 may perform one or more other tasks described as being performed by one or more other components of device 200.

Figure 3:
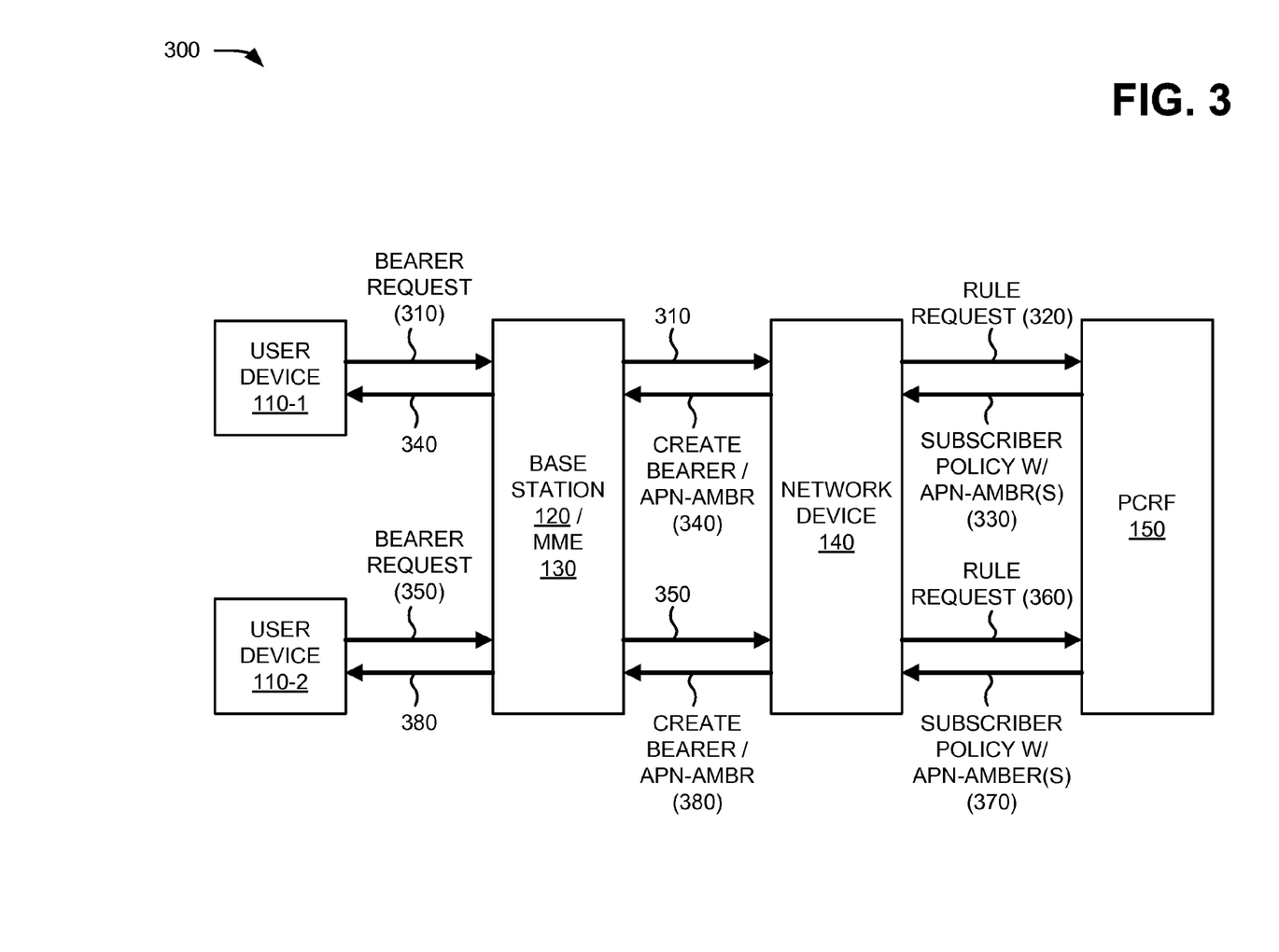
FIG. 3 is a diagram of example interactions between components of an example portion of the network depicted in FIG. 1.

FIG. 3 is a diagram of example interactions between components of an example portion 300 of network 100. As illustrated, example network portion 300 may include user devices 110-1 and 110-2, base station 120/MME 130, network device 140, and PCRF 150. User devices 110-1 and 110-2, base station 120/MME 130, network device 140, and PCRF 150 may include the features described above in connection with one or more of FIGS. 1 and 2.

As further shown in FIG. 3, a first user (not shown) may utilize user device 110-1 to generate a bearer request 310. For example, the first user may activate an application on user device 110-1 that requires communication with network 160. The first user may have a subscription service that provides uplink and/or downlink rate limiting for user device 110-1 (e.g., an AMBR of 5 Mbps). User device 110-1 may wirelessly provide bearer request 310 to base station 120/MME 130. Base station 120/MME 130 may forward bearer request 310 to network device 140.

In response to receiving bearer request 310, network device 140 may send a rule request 320 to a particular PCRF 150 that has been selected by network device 140 based on a particular selection rule. For example, network device 140 may send rule request 320 to the nearest PCRF 150. PCRF 150 may determine particular PCRF parameters relevant to rule request 320, such as QoS information (e.g., a QCI relevant to rule request 320), an uplink APN-AMBR (e.g., consistent with the first user's subscription), and a downlink APN-AMBR (e.g., consistent with the first user's subscription). In response to rule request 320, PCRF 150 may send the particular PCRF parameters, including the QCI, uplink APN-AMBR, and downlink APN-AMBR to network device 140, as indicated by reference number 330.

Network device 140 may implement the received PCRF parameters 330. More particularly, network device 140 may install a policy to rate limit subscriber traffic (e.g., to/from user device 110-1) over a specific bearer (e.g., associated with user device 110-1) defined by the QCI based on the uplink APN-AMBR and downlink APN-AMBR provided in PCRF parameters 330. Network device 140 may provide the policy to base station 120/MME 130, as indicated by reference number 340. Base station 120/MME 130 may receive policy 340 and may forward policy 340 to user device 110-1 to activate the bearer between user device 110-1 and network device 140.

As further shown in FIG. 3, a second user (not shown) may utilize user device 110-2 to generate a bearer request 350. For example, the second user may activate an application on user device 110-2 that requires communication with network 160. The second user may have a subscription service that provides uplink and/or downlink rate limiting for user device 110-2 (e.g., an AMBR of 10 Mbps). User device 110-2 may wirelessly provide bearer request 350 to base station 120/MME 130. Base station 120/MME 130 may forward bearer request 350 to network device 140 which may be the same (as shown in FIG. 3) or a different network device 140 than described above with respect to rule request 310.

In response to receiving bearer request 350, network device 140 may send a rule request 360 to a particular PCRF 150 that has been selected by network device 140 based on a particular selection rule. For example, network device 140 may send rule request 360 to the nearest PCRF 150, which may be the same (as shown in FIG. 3) or a different PCRF 150 than described above with respect to rule request 320. PCRF 150 may determine particular PCRF parameters relevant to rule request 360, such as QoS information (e.g., a QCI relevant to rule request 360), an uplink APN-AMBR (e.g., consistent with the second user's subscription), and a downlink APN-AMBR (e.g., consistent with the second user's subscription). In response to rule request 360, PCRF 150 may send the particular PCRF parameters, including the QCI, uplink APN-AMBR, and downlink APN-AMBR to network device 140, as indicated by reference number 370.

Network device 140 may implement the received PCRF parameters 370. More particularly, network device 140 may install a policy to rate limit subscriber traffic (e.g., to/from user device 110-2) over a specific bearer (e.g., associated with user device 110-2) defined by the QCI based on the uplink APN-AMBR and downlink APN-AMBR provided in PCRF parameters 370. Network device 140 may provide the policy to base station 120/MME 130, as indicated by reference number 380. Base station 120/MME 130 may receive policy 380 and may forward policy 380 to user device 110-2 to activate the bearer between user device 110-2 and network device 140.

In a multiple access network (e.g., such as network portion 300), different application services (e.g., voice and/or data) may compete for the same air interface and transport network resources (e.g., base station 120, MME 130, and/or network device 140). Base station 120 may monitor resource utilization information of the IP wireless access network. During periods of congestion (e.g., where the air interface and transport network resources cannot simultaneously meet all demands), base station 120 may allocate bandwidth to different users (e.g., user devices 110-1 and 110-2) based on their QoS settings. However, without knowledge of the different APN-AMBRs associated with the user devices, base station 120 cannot take into account user rate limiting configurations, which may cause premium subscribers (e.g., user device 110-2) to lose the benefit of their subscription over standard subscribers (e.g., user device 110-1) during periods of network congestion. For example, assume user device 110-1 has an uplink APN-AMBR of 5 Mbps for bearer policy 340 and user device 110-2 has an uplink APN-AMBR of 10 Mbps for bearer policy 380 and that both bearer policy 340 and 380 have the same QCI value. Without knowledge of the different APN-AMBRs, base station 120 may apply a bandwidth allocation of 3 Mbps to both user devices 110-1 and 110-2 during a period of network congestion. In order to address such issues, systems and/or methods described herein may provide APN-AMBRs to base station 120 (e.g., for differentiating services) in an IP wireless access network (e.g., such as network portion 300). Base station 120 may thus allocate bandwidth based on both QCI settings and different APN-AMBRs.

Although FIG. 3 shows example components of network portion 300, in other implementations, network portion 300 may include fewer components, different components, differently arranged components, and/or additional components than depicted in FIG. 3. Alternatively, or additionally, one or more components of network portion 300 may perform one or more other tasks described as being performed by one or more other components of network portion 300.

Figure 4A:
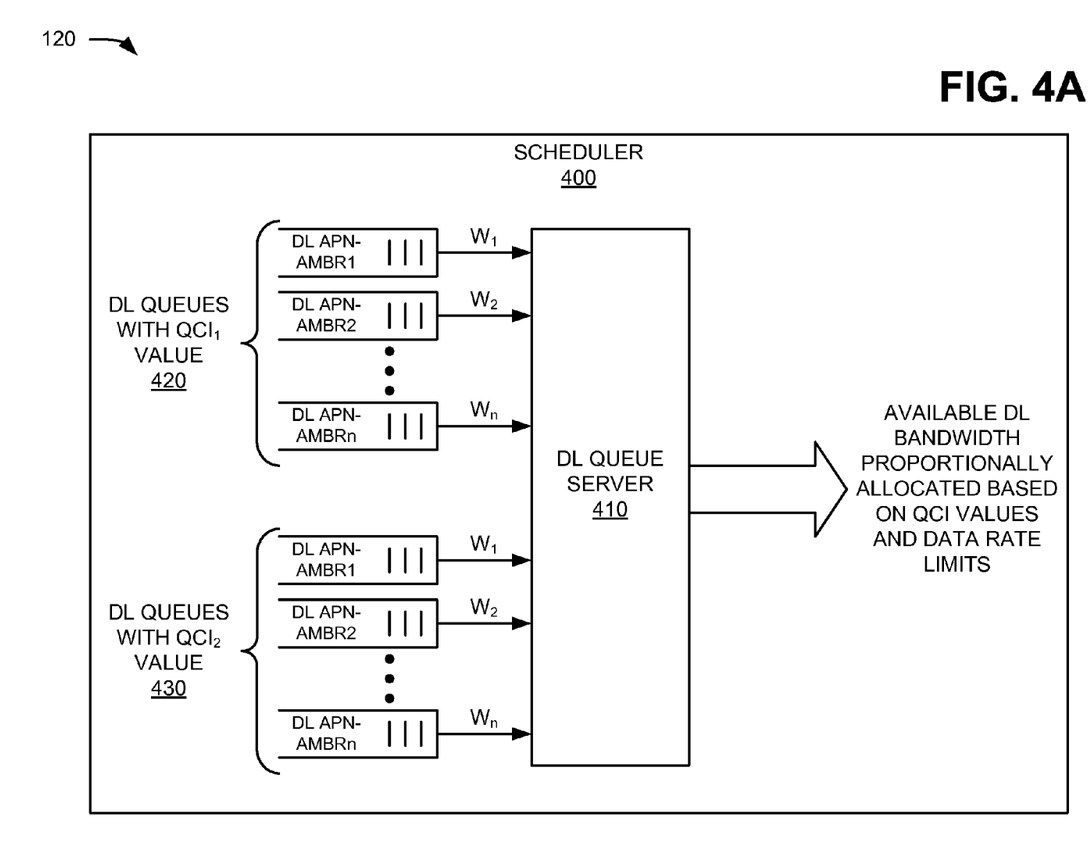
FIGS. 4A and 4B are diagrams of example functional components of a base station of the network illustrated in FIG. 1.
Figure 4B:
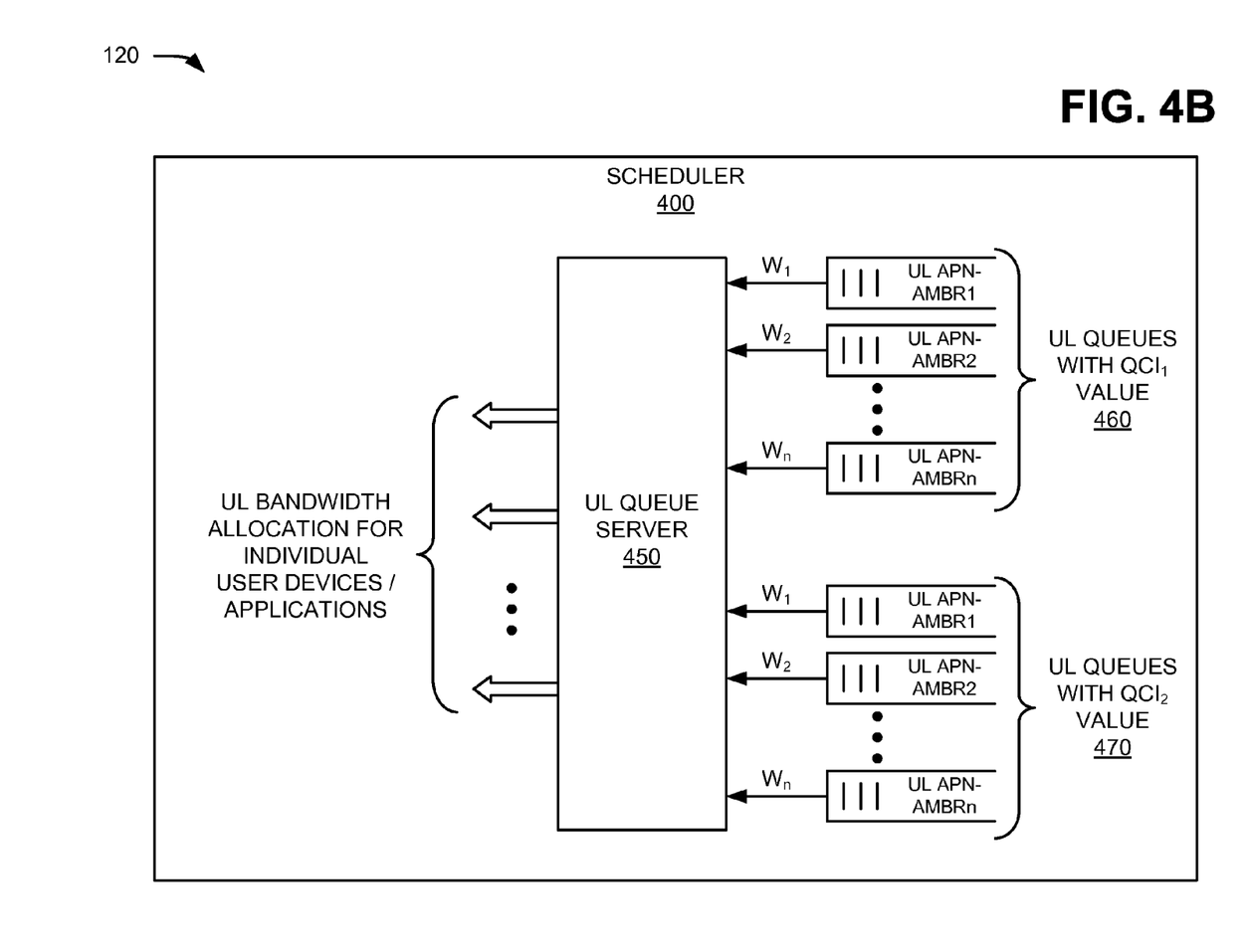

FIGS. 4A and 4B are diagrams of example functional components of base station 120. In one implementation, the functions described in connection with FIGS. 4A and 4B may be performed by one or more components of device 200 (FIG. 2) or one or more devices 200. As shown in FIGS. 4A and 4B, base station 120 may include a scheduler 400 that includes a downlink (DL) queue server 410 (FIG. 4A), an uplink (UL) queue server 450 (FIG. 4B), and multiple queues.

Scheduler 400 may include hardware or a combination of hardware and software to schedule downlink and uplink transmissions between user devices 110 and base station 120 over a wireless IP network. Scheduler 400 may also allocate physical layer (e.g., media access control (MAC) layer) resources to be used. Scheduler 400 may apply scheduling algorithms which determine what traffic gets sent and/or when the traffic gets sent. Scheduler 400 may generally be responsible for implementing QoS characteristics assigned to radio bearers (e.g., as defined in policies 340 and 380).

As shown in FIG. 4A, scheduler 400 may include DL queue server 410. DL queue server 410 may service queue groups 420/430 with traffic directed to user devices 110. Queue groups 420/430 may be logically divided into service groups based on QCI values. Thus, queue group 420 may include queues with a first QCI value (e.g., "$QCI_1$"), and queue group 430 may include queues with a second QCI value (e.g., "$QCI_2$"). Other queue groups (not shown) may be used for additional QCI values. During periods of congestion, DL queue server 410 may allocate certain amounts of bandwidth for queue groups 420/430 based on QoS parameters for each QCI value. Within each queue group 420/430, scheduler 400 may include queues for specific APN-AMBR values (e.g., "DL APN-AMBR1," "DL APN-AMBR2," . . . , "DL APN-AMBRn"). The DL APN-AMBR may correspond to downlink APN-AMBR values received, for example, from network device 140 via bearer policies 340/380.

Instead of allocating equally from each queue within queue group 420/430, DL queue server 410 may apply a bandwidth weight factor, $W_i$, to each active queue within queue group 420 and to each active queue within queue group 430. In one implementation the weight factor may be calculated as:

$$W_i = \frac{DLAPN\text{-}AMBR_i}{DLAPN\text{-}AMBR_1 + DLAPN\text{-}AMBR_2 + \ldots + DLAPN\text{-}AMBR_n}$$

where i may represent a particular queue and n may represent the total number of active queues in the queue group. The bandwidth weight factor, $W_i$, may be used to allocate the bandwidth allotted for a particular QoS class to ensure that the bandwidth is allocated in proportion to the cumulative downlink APN-AMBR for each user device 110 and/or application running on each user device 110. Downlink data from each queue of queue groups 420/430 may be transmitted by base station 120, and the bandwidth weight factor, $W_i$, may also be determined at base station 120, allowing a proportionate data transmission for all user devices 110 during periods of network congestion.

As shown in FIG. 4B, scheduler 400 may include UL queue server 450. UL queue server 450 may service queue groups 460/470 with traffic directed from user devices 110. Queue groups 460/470 may be logically divided into service groups based on QCI values. Thus, queue group 460 may include queues with a first QCI value (e.g., "$QCI_1$"), and queue group 470 may include queues with a second QCI value (e.g., "$QCI_2$"). Other queue groups (not shown) may be used for additional QCI values. During periods of congestion, UL queue server 450 may allocate certain amounts of bandwidth for queue groups 460/470 based on QoS parameters for each QCI value. Within each queue group 460/470, scheduler 400 may include queues for specific APN-AMBR values (e.g., "UL APN-AMBR1," "UL APN-AMBR2," "UL APN-AMBRn"). The UL APN-AMBR may correspond to uplink APN-AMBR values received, for example, from network device 140 via bearer policies 340/380.

UL queue server 450 may apply a bandwidth weight factor, $W_i$, to each active queue within queue group 460 and to each active queue within queue group 470. In one implementation the weight factor may be calculated as:

$$W_i = \frac{ULAPN\text{-}AMBR_i}{ULAPN\text{-}AMBR_1 + ULAPN\text{-}AMBR_2 + \ldots + ULAPN\text{-}AMBR_n}$$

where i may represent a particular queue and n may represent the total number of active queues in the particular queue group. The bandwidth weight factor, $W_i$, may be used to determine bandwidth allocations for individual user devices 110 to ensure that the bandwidth is allocated in proportion to the cumulative uplink APN-AMBRs for each user device 110 and/or application running on each user device 110. Each user device 110 may have uplink traffic for multiple QCI values and multiple UL APN-AMBRs. Calculation of the bandwidth weight factor, $W_i$, and the bandwidth allocation may be determined by scheduler 400 without knowledge of user devices 110. Base station 120 may provide, to each user device 110, a bandwidth allocation based on the QoS parameters for each QCI value and the UL APN-AMBR associated with a particular APN.

Although FIGS. 4A and 4B show example functional components of base station 120, in other implementations, base station 120 may contain different functional components, differently arranged functional components, or additional functional components than depicted in FIGS. 4A and 4B. Alternatively, or additionally, one or more functional components of base station 120 may perform one or more other tasks described as being performed by one or more other functional components of base station 120.

Figure 5:
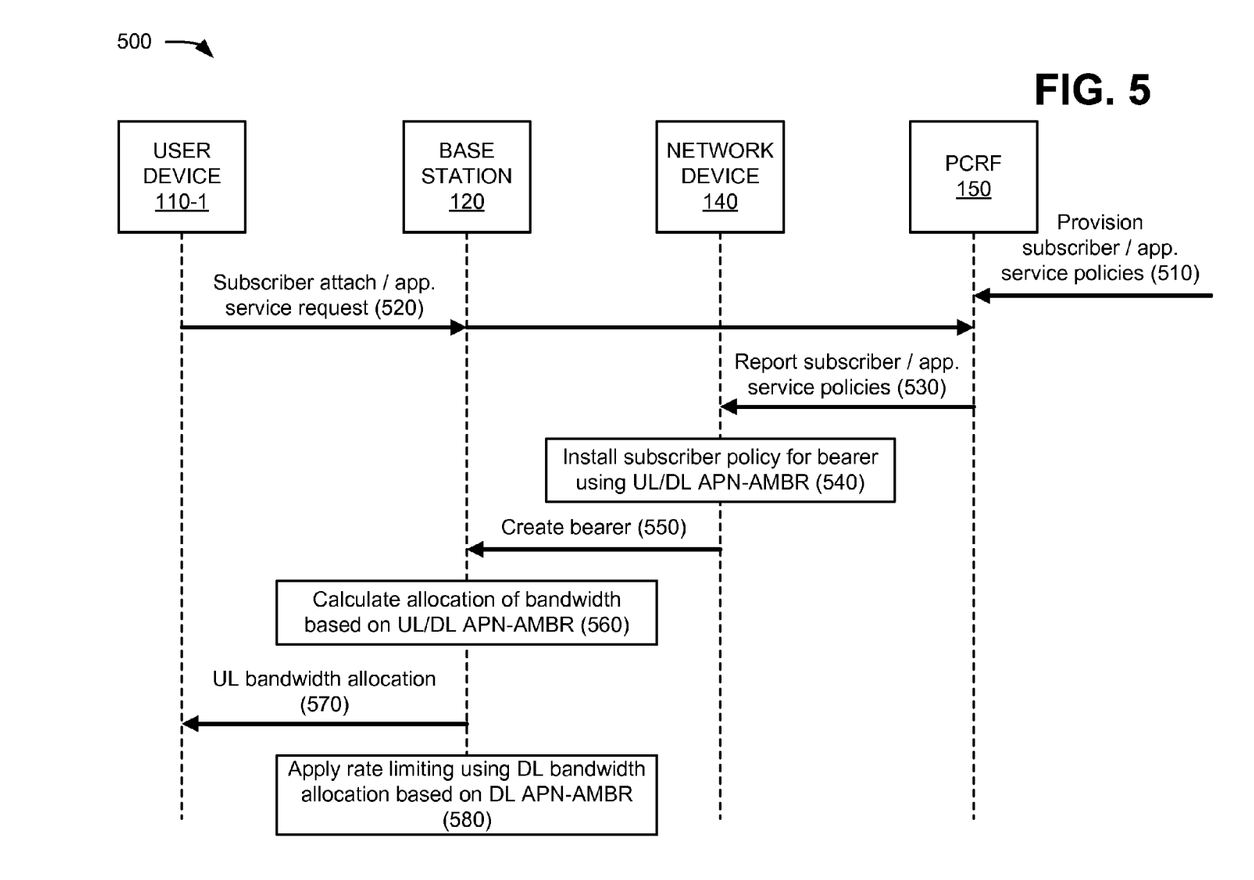
FIG. 5 is a flow diagram of example interactions between components of another example portion of the network depicted in FIG. 1.

FIG. 5 is a flow diagram of example interactions between components of another example portion 500 of network 100. As illustrated, example network portion 500 may include user device 110-1, base station 120, network device 140, and PCRF 150. User device 110-1, base station 120, network device 140, and PCRF 150 may include the features described above in connection with one or more of FIGS. 1-4B.

As further shown in FIG. 5, subscriber and/or application service priorities may be pre-provisioned in PCRF 150 (e.g., by service providers, network resources, and/or other sources), as indicated by reference number 510.

Subscriber/application service policy configurations 510 may include information associated with subscribers (e.g., users of user devices 110). For example, subscriber/application service policy configurations 510 may include subscriber service plan information (e.g., whether subscribers subscribe to premium services or less than premium services, data plans of subscribers, etc.); subscriber hardware information (e.g., what type(s) of user devices 110 are utilized by subscribers, capabilities of such user devices 110, etc.); priorities associated with the subscribers (e.g., whether one subscriber has a higher priority over another subscriber); etc. In one implementation, subscriber/application service policy configurations 510 may define bandwidth allocations (e.g., maximum bit rates) associated with subscribers of the IP wireless access network (e.g., provided by base station 120 and/or network device 140). For example, if a first subscriber pays a higher fee than a second subscriber for services provided by the IP wireless access network, then subscriber/application service policy configurations 410 may allocate a greater percentage of bandwidth of the IP wireless access network to the first subscriber than the second subscriber.

A user (not shown) may utilize user device 110-1 to attempt to initially attach to the IP wireless access network (e.g., provided by base station 120, MME 130, and/or network device 140), as indicated by reference number 520 (subscriber attach request 520). Alternatively, if user device 110-1 is attached to the IP wireless access network, the first user may utilize user device 110-1 to request an application service, as further indicated by reference number 520 (application service request 520). When the user (e.g., via user device 110-1) provides subscriber attach/application service request 520 to base station 120, base station 120 and/or network device 140 may cause PCRF 150 to report the subscriber/application service priorities to network device 140, as indicated by reference number 530. Subscriber/application service priorities 530 may include, for example, a QCI value, an APN-uplink AMBR value, and a downlink APN-AMBR value.

Network device 140 may receive subscriber/application service priorities 530 and may install a subscriber policy for a bearer using the uplink APN-AMBR and downlink APN-AMBR, as indicated by reference number 540. Network device 140 may provide the policy to base station 120, as indicated by reference number 550. Base station 120 may receive the policy and may calculate bandwidth allocation for the bearer based on the uplink APN-AMBR and downlink APN-AMBR and other information in bearer policy 550, as indicated by reference number 560. For example, base station 120 may monitor network resource utilization information associated with the IP wireless access network and determine if QoS measures should be applied to manage network congestion. If congestion exists, base station 120 may calculate an uplink bandwidth allocation based on a QCI value and weight factor, $W_i$, that incorporates the uplink APN-AMBR for the requested APN. Base station 120 may also calculate a downlink bandwidth allocation based on a QCI value and a weight factor, $W_i$, that incorporates the downlink APN-AMBR for the requested APN.

Base station 120 may inform user device 110-1 of the bearer grant and that bandwidth is allocated for a particular APN, as indicated by reference number 570. User device 110-1 may use the UL bandwidth allocation to regulate traffic in accordance with QoS policy and in proportion to the subscriber's maximum UL bandwidth. Base station 120 may apply rate limiting to downlink traffic using the calculated DL bandwidth allocation, as indicated by reference number 580.

Although FIG. 5 shows example components of network portion 500, in other implementations, network portion 500 may include fewer components, different components, differently arranged components, and/or additional components than depicted in FIG. 5. Alternatively, or additionally, one or more components of network portion 500 may perform one or more other tasks described as being performed by one or more other components of network portion 500.

Figure 6:
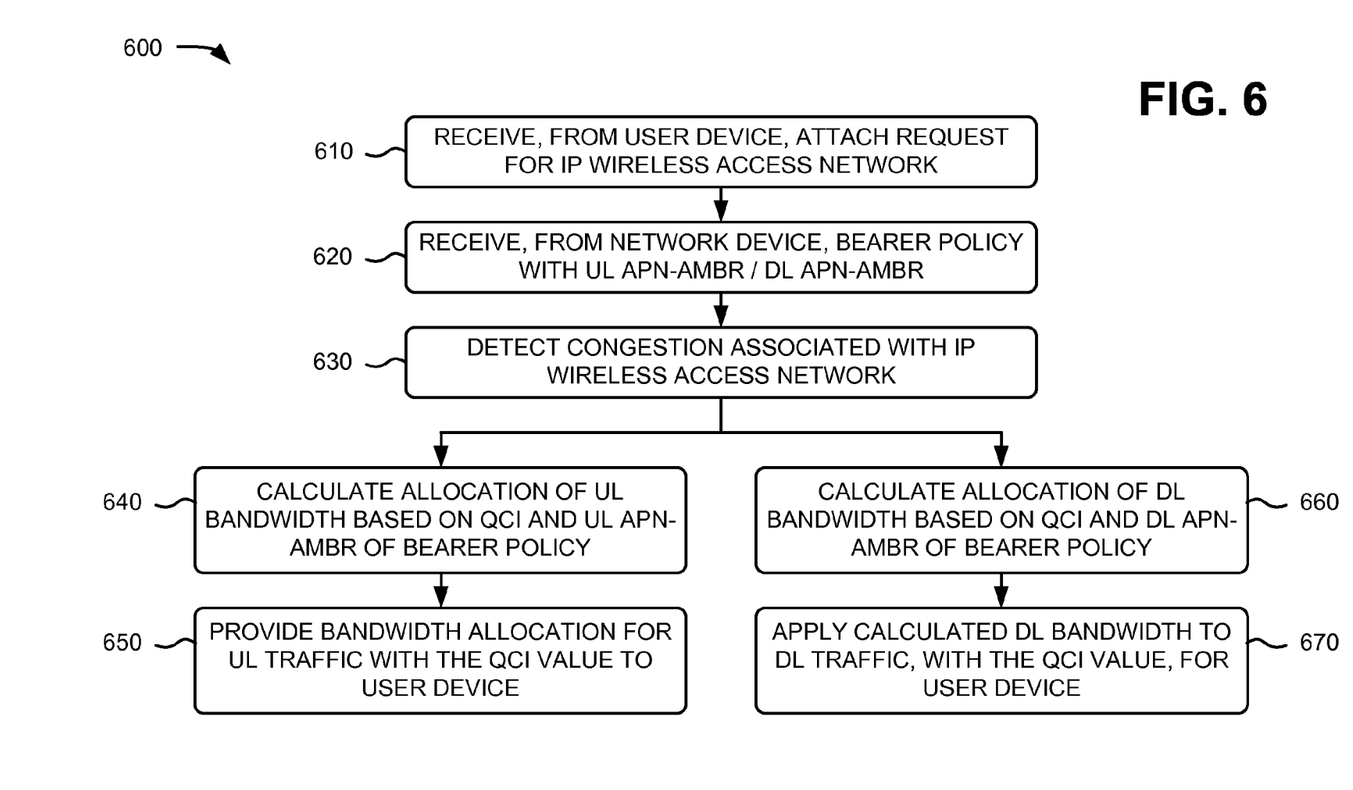
FIGS. 6-8 are flow charts of an example process for providing proportional rate limiting for QoS classes in a wireless access network according to an implementation described herein.
Figure 7:
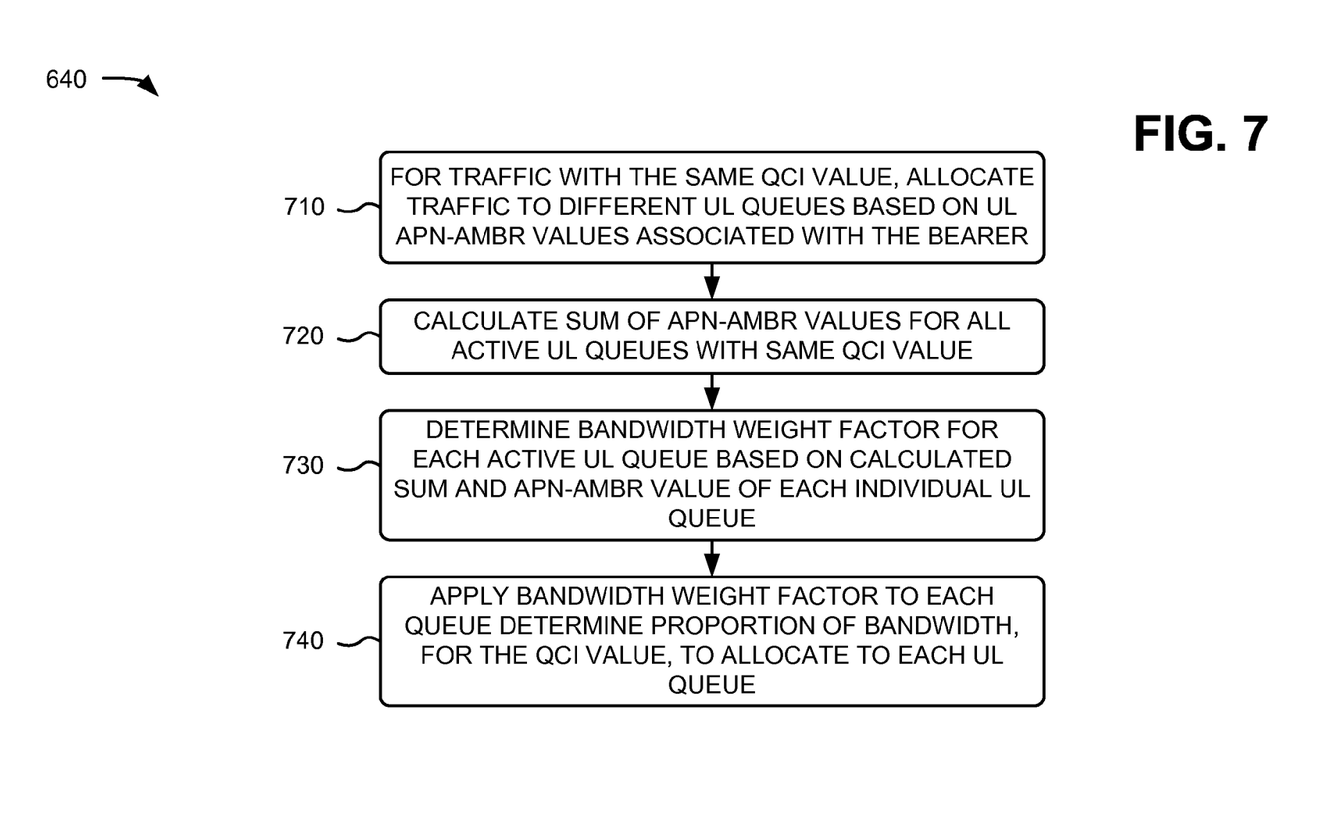
Figure 8:
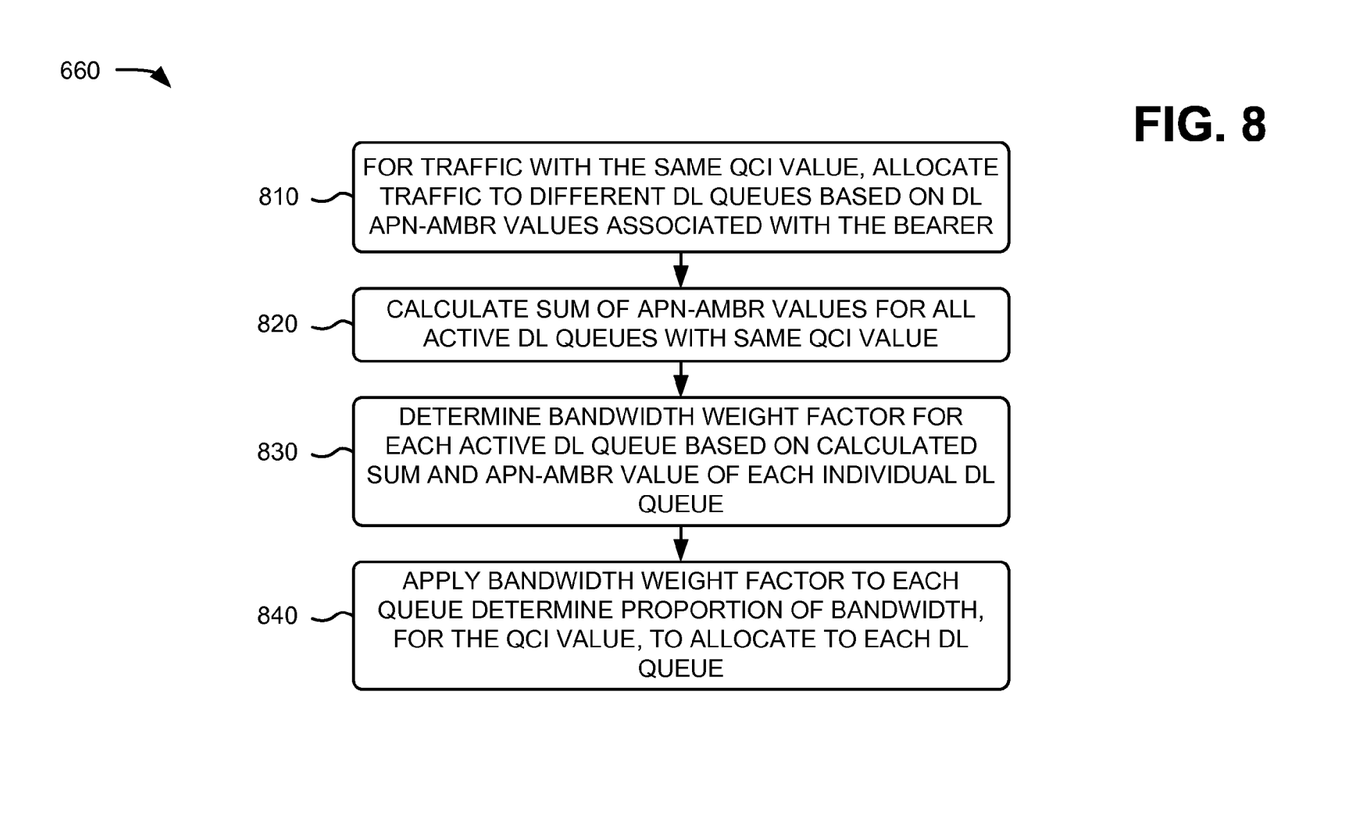

FIGS. 6-8 are flow charts of example process 600 for providing proportional rate limiting for QoS classes in a wireless access network according to implementations described herein. In one implementation, process 600 may be performed by base station 120. In another implementation, some or all of process 600 may be performed by another device or group of devices, including or excluding base station 120.

As illustrated in FIG. 6, process 600 may include receiving, from a user device, an attach request for an IP wireless access network (block 610), and receiving, from a network device, a bearer policy with an uplink (UL) APN-AMBR and/or a downlink (DL) APN-AMBR (block 620). For example, in implementations described above in connection with FIG. 3, user device 110-1 may wirelessly provide bearer request 310 to base station 120/MME 130. Base station 120/MME 130 may forward bearer request 310 to network device 140, and network device 140 may send rule request 320 to the nearest PCRF 150. PCRF 150 may determine particular PCRF parameters relevant to rule request 320, such as QoS information (e.g., a QCI value relevant to rule request 320), an uplink APN-AMBR (e.g., consistent with the first user's subscription), and a downlink APN-AMBR (e.g., consistent with the first user's subscription). PCRF 150 may send the particular PCRF parameters, including the QCI, uplink APN-AMBR, and downlink APN-AMBR to network device 140, as indicated by reference number 330. Network device 140 may install a policy to rate limit subscriber traffic (e.g., to/from user device 110-1) over a specific bearer (e.g., associated with user device 110-1) defined by the QCI based on the uplink APN-AMBR and downlink APN-AMBR provided in PCRF parameters 330. Network device 140 may provide the policy to base station 120/MME 130, as indicated by reference number 340, which may be received by base station 120/MME 130.

As further shown in FIG. 6, process 600 may include detecting congestion associated with the IP wireless access network (block 630). For example, in implementations described above in connection with FIG. 5, base station 120 may monitor network resource utilization information associated with the IP wireless access network and determine if QoS measures should be applied to manage network congestion.

Returning to FIG. 6, process 600 may include calculating allocation of UL bandwidth based on a QCI and a UL APN-AMBR for the bearer policy (block 640) and providing, to the user device, a bandwidth allocation for UL traffic associated with the bearer (block 650). For example, in implementations described above in connection with FIG. 5, if network congestion exists, base station 120 may calculate a bandwidth allocation based on a QCI value and a weight factor, $W_i$, that incorporates the uplink APN-AMBR for the requested APN. Base station 120 may inform user device 110-1 of the bearer grant and that bandwidth is allocated for a particular APN, as indicated by reference number 570. User device 110-1 may use the UL bandwidth allocation to regulate traffic in accordance with QoS policy and in proportion to the subscriber's maximum UL bandwidth.

Returning to FIG. 6, process 600 may include calculating allocation of DL bandwidth based on a QCI and a DL APN-AMBR for the bearer policy (block 660) and applying the calculated DL bandwidth to DL traffic with the QCI value, for the user device (block 670). For example, in implementations described above in connection with FIG. 5, base station 120 may also calculate a downlink bandwidth allocation based on a QCI value and a weight factor, $W_i$, that incorporates the downlink APN-AMBR for the requested APN. Base station 120 may apply rate limiting to downlink traffic using the calculated DL bandwidth allocation, as indicated by reference number 580.

Process block 640 may include the process blocks depicted in FIG. 7. As shown in FIG. 7, process block 640 may include, for traffic with the same QCI value, allocating the traffic to different UL queues based on UL APN-AMBR values associated with the bearer (block 710), and calculating a sum of the UL APN-AMBR values for all active UL queues associated with the same QCI value (block 720). For example, in implementations described above in connection with FIG. 4B, UL queue server 450 may service queue groups 460/470 with traffic directed to user devices 110. Queue groups 460/470 may be logically divided into service groups based on QCI values. Thus, queue group 460 may include queues with a first QCI value (e.g., "$QCI_1$"), and queue group 470 may include queues with a second QCI value (e.g., "$QCI_2$"). During periods of congestion, UL queue server 450 may allocate certain amounts of bandwidth for queue groups 460/470 based on QoS parameters for each QCI value. Within each queue group 460/470, scheduler 400 may include queues for specific APN-AMBR values (e.g., "UL APN-AMBR1," "UL APN-AMBR2," "UL APN-AMBRn"). The cumulative maximum bit rate from these queues may be calculated.

Process block 640 may also include determining a bandwidth weight factor for each of the active queues based on the calculated sum and an APN-AMBR value associated with each individual queue (block 730), and applying the bandwidth weight factor to each UL queue to determine a proportion of total bandwidth, for the QCI value, to allocate to each UL queue (block 740). For example, in implementations described above in connection with FIG. 4B, UL queue server 450 may apply a bandwidth weight factor, $W_i$, to each active queue within queue group 460 and to each active queue within queue group 470. The bandwidth weight factor, $W_i$, may be used to determine bandwidth allocations for individual user devices 110 to ensure that the bandwidth is allocated in proportion to the cumulative uplink APN-AMBRs for each user device and/or application running on each user device. Each user device 110 may have uplink traffic for multiple QCI values and multiple UL APN-AMBRs. Calculation of the bandwidth weight factor, $W_i$, and the bandwidth allocation may be determined by scheduler 400 without knowledge of user devices 110. Base station 120 may provide, to each user device 110, a bandwidth allocation based on the QoS parameters for each QCI value and the UL APN-AMBR associated with a particular APN.

Process block 660 may include the process blocks depicted in FIG. 8. As shown in FIG. 8, process block 660 may include, for traffic with the same QCI value, allocating the traffic to different DL queues based on DL APN-AMBR values associated with the bearer (block 810), and calculating a sum of the DL APN-AMBR values for all active DL queues associated with the same QCI value (block 820). For example, in implementations described above in connection with FIG. 4A, DL queue server 410 may service queue groups 420/430 with traffic directed to user devices 110. Queue groups 420/430 may be logically divided into service groups based on QCI values. Thus, queue group 420 may include queues with a first QCI value (e.g., "$QCI_1$"), and queue group 430 may include queues with a second QCI value (e.g., "$QCI_2$"). Other queue groups (not shown) may be used for additional QCI values. During periods of congestion, DL queue server 410 may allocate certain amounts of bandwidth for queue groups 420/430 based on QoS parameters for each QCI value. Within each queue group 420/430, scheduler 400 may include queues for specific APN-AMBR values (e.g., "DL APN-AMBR1," "DL APN-AMBR2," ..., "DL APN-AMBRn"). The cumulative maximum bit rate from these queues may be calculated.

Process block 660 may also include determining a bandwidth weight factor for each of the active DL queues based on the calculated sum and the DL APN-AMBR value associated with each individual DL queue (block 830), and applying the bandwidth weight factor to each DL queue to determine a proportion of total bandwidth, for the QCI value, to allocate to each DL queue (block 840). For example, in implementations described above in connection with FIG. 4A, DL queue server 410 may apply a bandwidth weight factor, $W_i$, to each active queue within queue group 420 and to each active queue within queue group 430. The bandwidth weight factor, $W_i$, may be used to allocate the bandwidth allotted for a particular QoS class to ensure that the bandwidth is allocated in proportion to the cumulative downlink APN-AMBRs for each user. Downlink data from each queue of queue groups 420/430 may be transmitted by base station 120, and the bandwidth weight factor, $W_i$, may also be determined at base station 120, allowing a proportionate data transmission for all user devices 110 during periods of network congestion.

Systems and/or methods described herein may receive, via an IP wireless access network, an initial attach request from a user device. Based on the initial attach request, the systems and/or methods may obtain a subscriber bearer policy that includes a particular quality-of-service control indicator (QCI) value, an uplink data rate limit, and a downlink data rate limit. The systems and/or methods may calculate an uplink bandwidth allocation, based on the QCI value and the uplink data rate limit, that is proportionate to the total maximum data rate of all uplink traffic with the same QCI value. The systems and/or methods may also calculate a downlink bandwidth allocation, based on the QCI value and the downlink data rate limit, that is proportionate to the total maximum data rate of all downlink traffic with the same QCI value.

The foregoing description of implementations provides illustration and description, but is not intended to be exhaustive or to limit the invention to the precise form disclosed. Modifications and variations are possible in light of the above teachings or may be acquired from practice of the invention.

For example, while series of blocks have been described with regard to FIGS. 6-8, the order of the blocks may be modified in other implementations. Further, non-dependent blocks may be performed in parallel.

It will be apparent that example aspects, as described above, may be implemented in many different forms of software, firmware, and hardware in the implementations illustrated in the figures. The actual software code or specialized control hardware used to implement these aspects should not be construed as limiting. Thus, the operation and behavior of the aspects were described without reference to the specific software code—it being understood that software and control hardware could be designed to implement the aspects based on the description herein.

Further, certain portions of the invention may be implemented as a "component" that performs one or more functions. These components may include hardware, such as an ASIC or a FPGA, or a combination of hardware and software.

Even though particular combinations of features are recited in the claims and/or disclosed in the specification, these combinations are not intended to limit the invention. In fact, many of these features may be combined in ways not specifically recited in the claims and/or disclosed in the specification. Although each dependent claim listed below may directly depend on only one other claim, the disclosure of the invention includes each dependent claim in combination with every other claim in the claim set.

No element, act, or instruction used in the present application should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A method, comprising:
   receiving, by a computing device, a policy to limit subscriber traffic over a particular bearer for an Internet protocol (IP) wireless access network, where the policy includes a particular quality-of-service control indicator (QCI) value, and one or more of an uplink data rate limit or a downlink data rate limit;
   detecting, by the computing device, network congestion associated with the IP wireless access network; and
   calculating, by the computing device, a bandwidth allocation for the bearer based on the QCI value and the one or more of the uplink data rate limit or the downlink data rate limit, where the bandwidth allocation is proportionate to a total maximum data rate of all uplink traffic with the same QCI value or of all downlink traffic with the same QCI value.

2. The method of claim 1, further comprising:
   receiving an initial attach request of a user device to the IP wireless access network that initiates a bearer creation; and
   providing, to the user device and in response to the initial attach request, the calculated bandwidth allocation for the bearer.

3. The method of claim 1, where the bandwidth allocation includes an uplink bandwidth allocation and a downlink bandwidth allocation.

4. The method of claim 1, further comprising:
   applying the calculated bandwidth allocation to downlink traffic received from a network device.

5. The method of claim 1, where the IP wireless access network includes a Long Term Evolution (LTE) network.

6. The method of claim 5, where the computing device comprises a base station of the LTE network.

7. The method of claim 1, where the uplink data rate limit includes an uplink access point name aggregated maximum bit rate (APN-AMBR), and where the downlink data rate limit includes a downlink APN-AMBR.

8. The method of claim 7, where calculating the bandwidth allocation for the bearer comprises:
   identifying active bearers with the same QCI value, where the calculated bandwidth allocation for the bearer is in proportion to the APN-AMBR values of the bearer compared to the total of the APN-AMBR values of the active bearers with the same QCI value.

9. The method of claim 1, further comprising:
   receiving, from a policy and charging rules function (PCRF) device, the policy to limit subscriber traffic over the bearer; and
   providing the policy to the computing device.

10. A device, comprising:
    a memory to store a plurality of instructions; and
    a processor to execute instructions in the memory to:
       receive a policy to limit subscriber traffic over a particular bearer for an Internet protocol (IP) wireless access network, where the policy includes a particular quality-of-service control indicator (QCI) value and an access point name aggregated maximum bit rate (APN-AMBR) value;
       detect network congestion associated with the IP wireless access network; and
       calculate a bandwidth allocation for the particular bearer based on the QCI value and the APN-AMBR value, where the calculating includes applying a weight factor to account for other bearers with the same QCI value and different APN-AMBR values.

11. The device of claim 10, where the processor is further to execute instructions in the memory to:
    provide, to a user device associated with the particular bearer, the calculated bandwidth allocation for the particular bearer, and
    apply the calculated bandwidth allocation to downlink traffic received from a network device.

12. The device of claim 10, where, when calculating the bandwidth allocation for the particular bearer, the processor is further to execute instructions in the memory to:
    calculate an uplink bandwidth allocation and a downlink bandwidth allocation for the particular bearer.

13. The device of claim 10, where the processor is further to execute instructions in the memory to:
    identify other active bearers with the same QCI value as the particular bearer, where the calculated bandwidth allocation for the particular bearer is in proportion to the APN-AMBR value for the particular bearer compared to the total of the APN-AMBR values of bearers with the same QCI value.

14. The device of claim 10, where the device comprises a base station of a Long Term Evolution (LTE) network.

15. The device of claim 10, where the APN-AMBR include a separate uplink APN-AMBR value and a separate downlink APN-AMBR value.

16. A method, comprising:
    receiving, by a base station for an Internet protocol (IP) wireless access network, an initial attach request from a user device;
    providing, by a policy and charging rules function (PCRF) device and based on the initial attach request, a subscriber bearer policy that includes a particular quality-of-service control indicator (QCI) value, an uplink data rate limit, and a downlink data rate limit;
    receiving, by the base station, the subscriber bearer policy;
    providing, by the base station and to the user device, an uplink bandwidth allocation based on the QCI value and the uplink data rate limit; and
    monitoring resource utilization information of the IP wireless access network;
    identifying downlink data rate limits of all active bearers under the same QCI value within the IP wireless access network; and calculating a downlink bandwidth allocation for rate limiting of downlink traffic to the user device in proportion to the cumulative data rate limits of the active bearers under the same QCI value;

applying, by the base station, rate limiting of downlink traffic to the user device based on the downlink bandwidth allocation.

17. The method of claim 16, where the uplink data rate limit includes one access point name aggregated maximum bit rate (APN-AMBR) value, and where the downlink data rate limit includes a different APN-AMBR value.

18. The method of claim 16, further comprising:

monitoring resource utilization information of the IP wireless access network;

identifying uplink data rate limits of all active bearers under the same QCI value within the IP wireless access network; and calculating the uplink bandwidth allocation in proportion to the cumulative data rate limits of the active bearers under the same QCI value.

19. A method, comprising:

receiving, by a computing device, a policy to limit subscriber traffic over a particular bearer for an Internet protocol (IP) wireless access network, where the policy includes a particular quality-of-service control indicator (QCI) value, and one or more of an uplink data rate limit or a downlink data rate limit, wherein the uplink data rate limit includes an uplink access point name aggregated maximum bit rate (APN-AMBR), and wherein the downlink data rate limit includes a downlink APN-AMBR;

detecting, by the computing device, network congestion associated with the IP wireless access network;

identifying, by the computing device, active bearers with the same QCI value; and calculating, by the computing device, a bandwidth allocation for the bearer based on the QCI value and the one or more of the uplink data rate limit or the downlink data rate limit, wherein the calculated bandwidth allocation for the bearer is in proportion to the APN-AMBR values of the bearer compared to the total of the APN-AMBR values of the active bearers with the same QCI value.

20. The method of claim 19, wherein the bandwidth allocation includes an uplink bandwidth allocation and a downlink bandwidth allocation.

* * * * *